(12) United States Patent
Martins et al.

(10) Patent No.: US 7,159,755 B2
(45) Date of Patent: Jan. 9, 2007

(54) METHOD AND APPARATUS FOR REBUILDING GAS TURBINE ENGINES

(75) Inventors: Adeilton Jorge Martins, Quitandinha Petropolis (BR); Adilio Alves Sardinha Filho, Petropolis (BR)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 10/772,983

(22) Filed: Feb. 5, 2004

(65) Prior Publication Data
US 2005/0173494 A1   Aug. 11, 2005

(51) Int. Cl.
B23K 31/00   (2006.01)

(52) U.S. Cl. .......................................... 228/119; 29/75

(58) Field of Classification Search ................ 228/219; 219/72, 74, 75
See application file for complete search history.

(56) References Cited

U.S. PATENT DOCUMENTS

| 4,822,248 A |   | 4/1989  | Wertz et al. |
|---|---|---|---|
| 4,866,236 A | * | 9/1989  | DeNale et al. ................. 219/74 |
| 5,319,179 A | * | 6/1994  | Joecks et al. ............ 219/137 R |
| 5,822,852 A |   | 10/1998 | Bewlay et al. |
| 5,981,897 A | * | 11/1999 | Offer et al. ................... 219/75 |
| 6,649,887 B1 |  | 11/2003 | Budinger |

* cited by examiner

*Primary Examiner*—Jonathan Johnson
(74) *Attorney, Agent, or Firm*—William Scott Andes; Armstrong Teasdale LLP

(57) ABSTRACT

A method for repairing a component within a SWET box is provided. The method includes providing a SWET box that has a divided interior volume that defines a welding chamber within the interior that is smaller than a total volume of the interior SWET box, positioning a component to be repaired within the welding chamber, introducing protective gas into the SWET box, and controlling the flow of protective gas into the SWET box to facilitate minimizing the consumption of the protective gas within the SWET box.

13 Claims, 6 Drawing Sheets

METHOD AND APPARATUS FOR REBUILDING GAS TURBINE ENGINES

BACKGROUND OF THE INVENTION

This invention relates generally to gas turbine engines, and more specifically to the repair of turbine blades used in gas turbine engines.

In at least some gas turbine engines, turbine blades used within the engine are cast to an approximate final shape. Portions of the turbine blades, including, but not limited to, a root portion, are then shaped to a final desired form by a shaping technique, such as grinding. The finished turbine blades are assembled into a turbine disk or rotor, such that a "dovetail" formed on each turbine blade engages a complimentarily shaped slot on the turbine disk.

Known turbine blades may be constructed from a high-temperature, high-strength alloy that is adapted to withstand the temperatures and stresses imposed on the parts of a turbine assembly. Because of the high cost of materials, casting operations, and finishing operations, at least some known turbine blades, after being in service, are refurbished to restore the original aerodynamic contours of portions of the blades. At least some known turbine blade repairs, such as those utilized in restoring blade tips, require building up the surface being repaired with a weld bead, and then grinding the surface back to its original contour.

One known technique for building up the blade material by welding is known as superalloy welding at elevated temperatures (SWET) in which tungsten inert gas (TIG) welding is combined with a pre-heating box, referred to as a SWET box. More specifically, in one known method, argon gas is supplied to the SWET box to provide a protective atmosphere for the blades being welded. The argon atmosphere facilitates reducing an amount of contamination within the weld and reducing the amount of cracking within the weld. More specifically, during use a sufficient volume of argon is provided to protect the blade and for good weld quality, and it is not unusual that the argon flow to the SWET box is set excessively high just to facilitate protecting the blades during welding. However, this technique not only unnecessarily increases argon consumption and its associated costs, but also the unnecessarily high gas flow increases the noise level in the area of the SWET box.

BRIEF DESCRIPTION OF THE INVENTION

In one aspect, a method for repairing a component within a SWET box is provided. The method includes providing a SWET box that has a divided interior volume that defines a welding chamber within the interior that is smaller than a total volume of the interior SWET box, positioning a component to be repaired within the welding chamber, introducing protective gas into the SWET box, and controlling the flow of protective gas into the SWET box to facilitate minimizing the consumption of the protective gas within the SWET box.

In another aspect, a liner assembly for a SWET box is provided. The liner assembly includes an enclosure configured to be received in a heating chamber of the SWET box. The enclosure includes a rear wall, a front wall opposite the rear wall, a pair of opposed end walls, and a dividing wall defining a welding chamber therein. A gas delivery system is provided for supplying a protective gas into the SWET box and the enclosure. A lid is coupled to the SWET box and extends over the heating chamber and the enclosure, encasing the heating chamber and the enclosure.

In another aspect, a SWET box is provided that includes a heating chamber and an enclosure configured to be received in the heating chamber. The enclosure includes a rear wall, a front wall opposite the rear wall, a pair of opposed end walls, and a dividing wall defining a welding chamber therein. A gas delivery system is provided for supplying a protective gas into the heating chamber and the enclosure. A lid is coupled to the heating chamber and extends over the heating chamber and the enclosure.

DETAILED DESCRIPTION OF THE INVENTION

Figure 1:
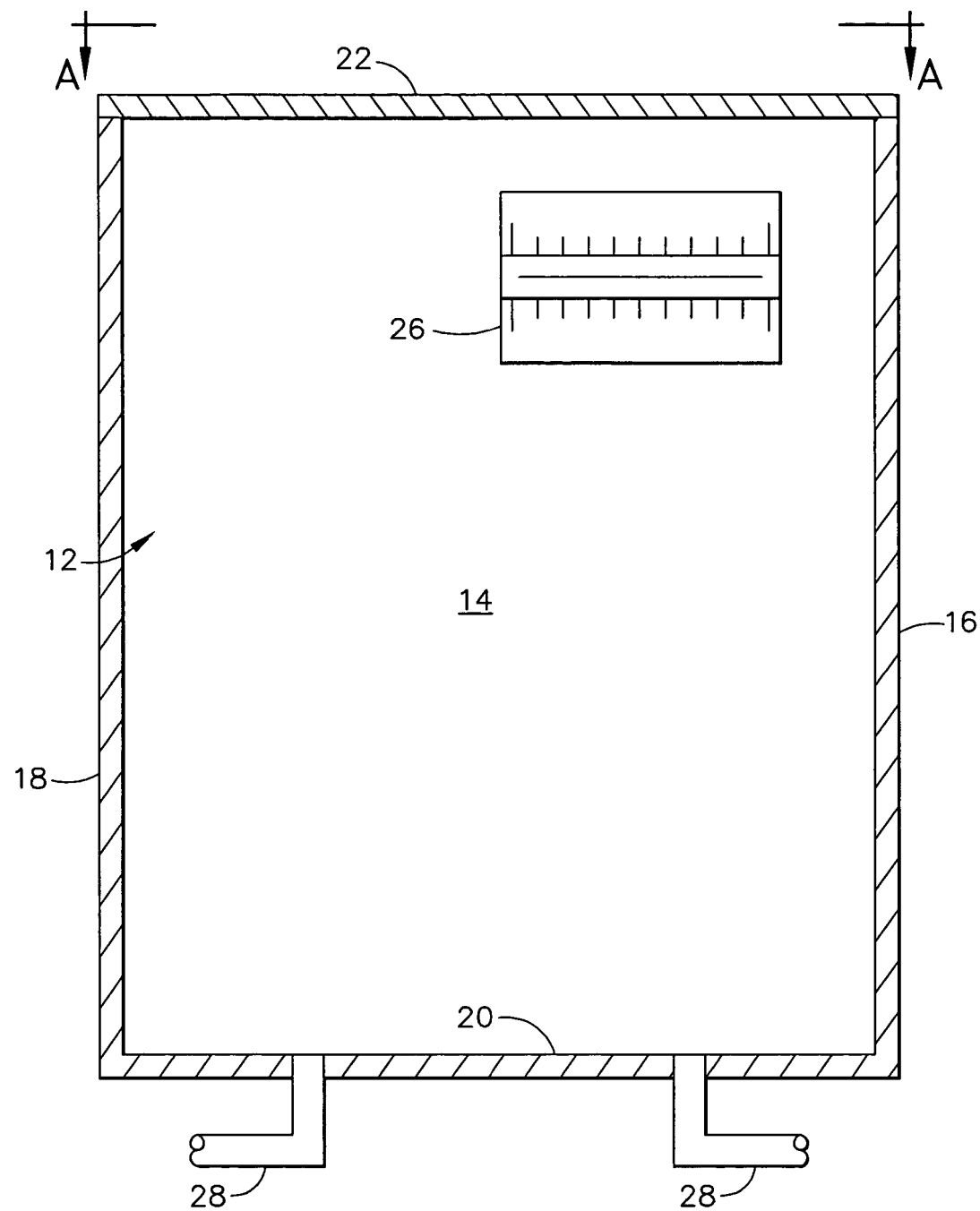
FIG. 1 is a schematic cross sectional view of a SWET box.

FIG. 1 is a schematic cross sectional view of a conventional SWET box 10 that may be used in superalloy welding at elevated temperatures (SWET). SWET box 10 includes a heating chamber 12 that has a back wall 14, an opposed front wall (not shown), and opposed ends 16 and 18. SWET box 10 also includes a floor 20 and a removable lid 22. Though shown as being substantially rectangular in shape in FIG. 1, SWET box 10 may be non-rectangular. For example, in one embodiment, one or both ends 16 and 18 are curved such that SWET box 10 has an elliptical cross-sectional profile when viewed from the top along sight line A—A. A heat source 26 is mounted in back wall 14. Typically, in SWET welding, heat source 26 includes one or more quartz lamps, however, other known heating methods may be used. Fluid inlets 28 are provided in floor 20 for introducing protective gasses to create a protective atmosphere inside SWET box 10.

Figure 2:
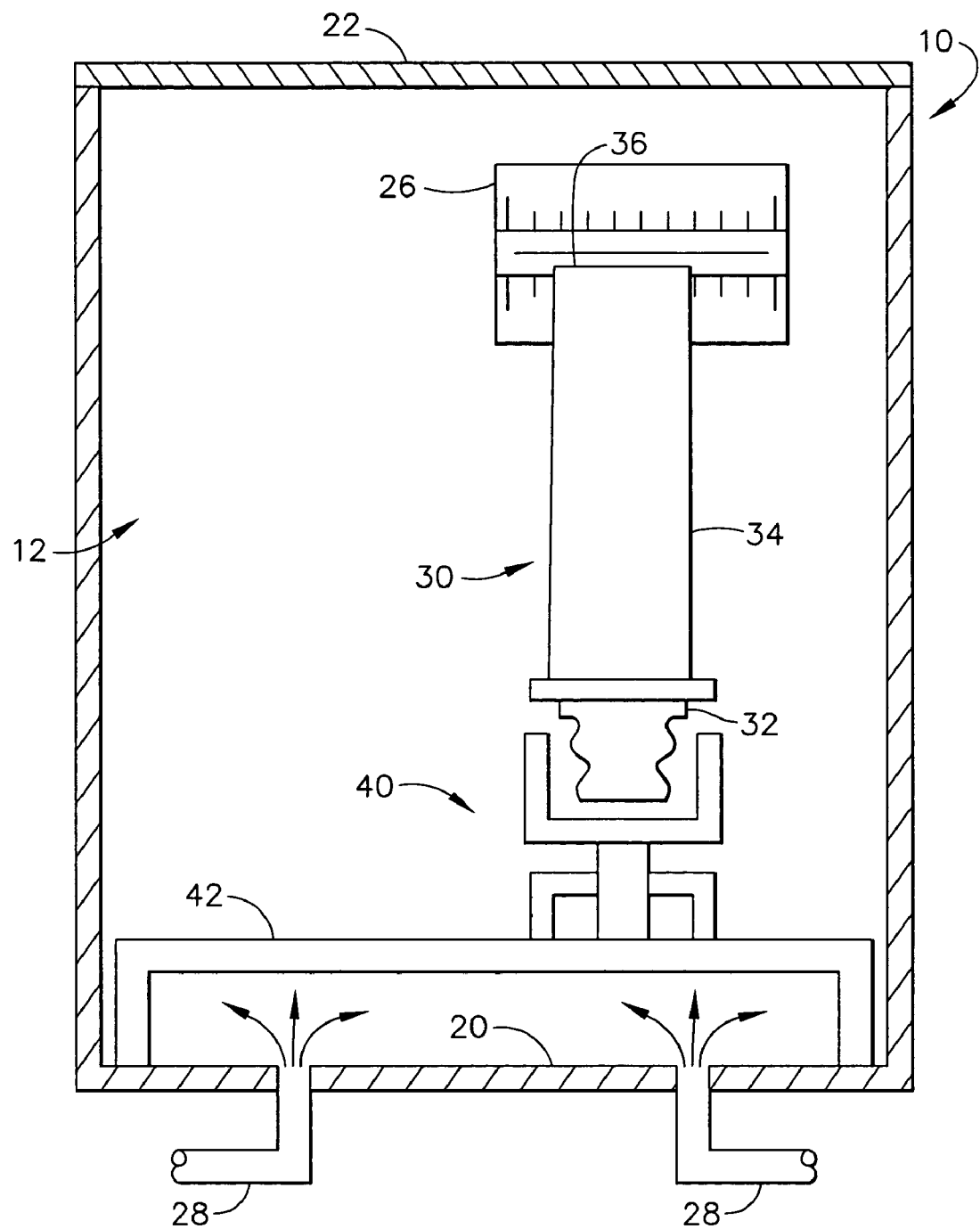
FIG. 2 is a schematic cross sectional view of a turbine blade being repaired within the SWET box shown in FIG. 1.

FIG. 2 is a schematic view of a turbine blade being repaired in SWET box 10. Blade 30 includes a dove tail 32 and an airfoil 34 that extends radially outward from dove tail 32 to an airfoil tip 36 that is being repaired. Blade 30 is retained in a fixture 40 that is positioned on a platform 42 at the bottom of heating chamber 12. Platform 42 rests on SWET box floor 20 such that fluid inlets 28 remain unobstructed. During use, blade 30 is heated by heat source 26, and a protective gas, such as argon, is supplied to SWET box 10 through fluid inlets 28. A weld repair is made to blade 30 in the presence of the protective gas.

As used herein, the terms "repair" and "repairing", may include any repair/inspection process. For example, repair processes may include various known repair techniques including welding, grinding, and/or machining. The above examples are intended as exemplary only, and thus are not intended to limit in any way the definition and/or meaning of the terms "repair" and repairing". In addition, as used herein the term "component" may include any object to which a repair process is applied. Furthermore, although the invention is described herein in association with a gas turbine engine, and more specifically for use with a turbine blade for a gas turbine engine, it should be understood that the present invention may be applicable to any component and/or any repair process. Accordingly, practice of the present invention is not limited to the repair of turbine blades or other components of gas turbine engines.

During SWET welding, SWET box 10 is filled with the protective gas to facilitate enhancing the quality of the weld while minimizing contamination and cracks within the weld. More specifically, to ensure the entire volume of SWET box 10 is filled with protective gas during welding, and increased gas flow rate is used to ensure that the volume of gas is maintained. The higher gas flow rate creates a higher noise level in the vicinity of SWET box 10.

Figure 3:
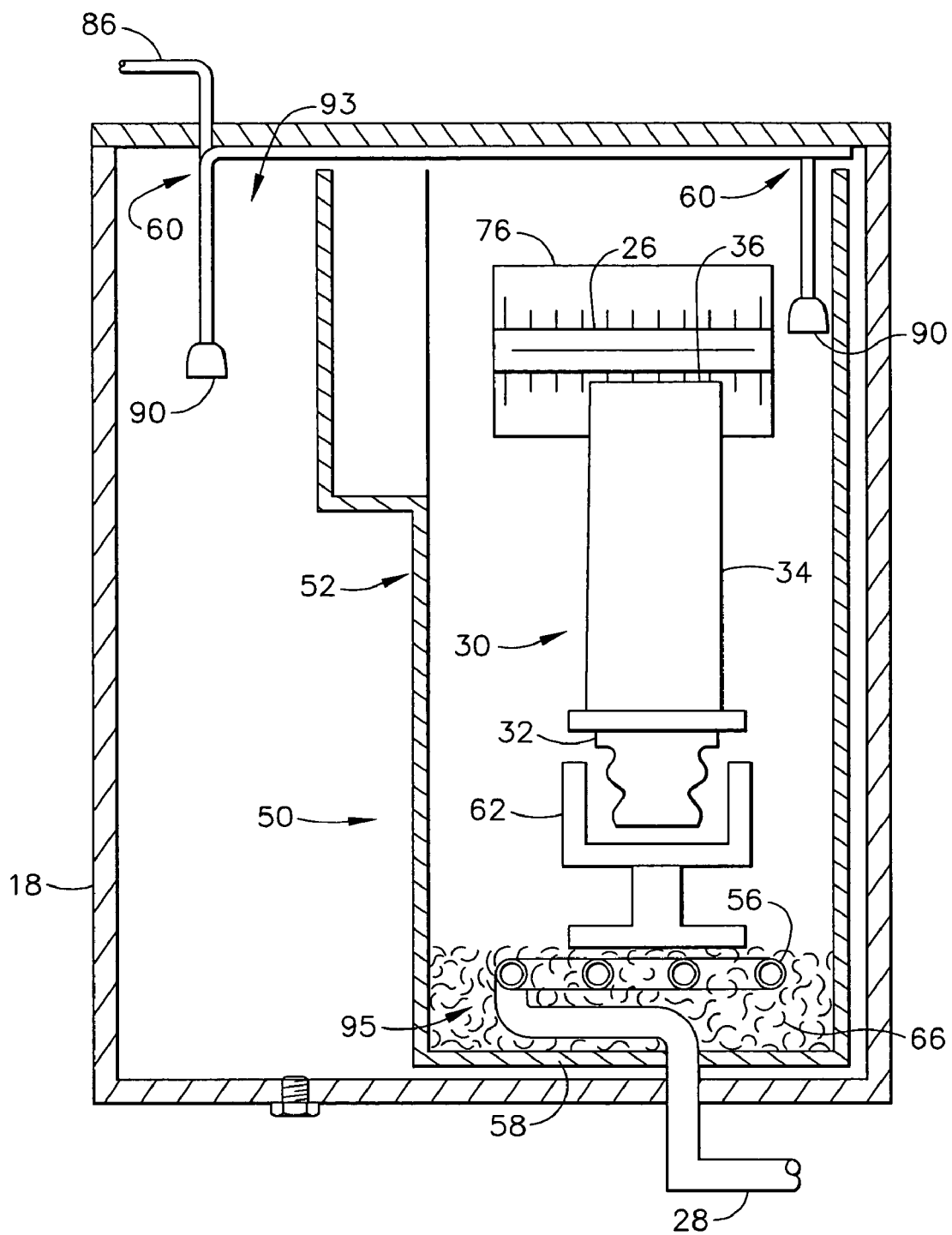
FIG. 3 is a schematic cross sectional view of the SWET box shown in FIG. 1 with a liner assembly.

FIG. 3 is a schematic cross sectional view of SWET box 10 including a liner assembly 50 for reducing the amount of protective gas supplied to SWET box 10 and the amount of noise generated in the vicinity of SWET box 10. Assembly 50 includes an enclosure 52 and a lid 54. A first gas delivery system 56 is positioned adjacent a floor 58 of enclosure 52, and a second gas delivery system 60 is coupled through lid 54. A blade holder 62 is positioned above first gas delivery system 56, and a layer of a metallic mesh material 66 is packed around first gas delivery system 56 to facilitate diffusing and reducing noise generated as the flow of protective gas enters SWET box 10. In the example embodiment, metallic mesh 66 is a steel, wool-like structure, and may be fabricated from any metallic material capable of withstanding the fabricating temperatures which develop during welding within SWET box 10. In the embodiment, the temperature within SWET box 10 may reach at least about 900 degrees Celsius.

Figure 4:
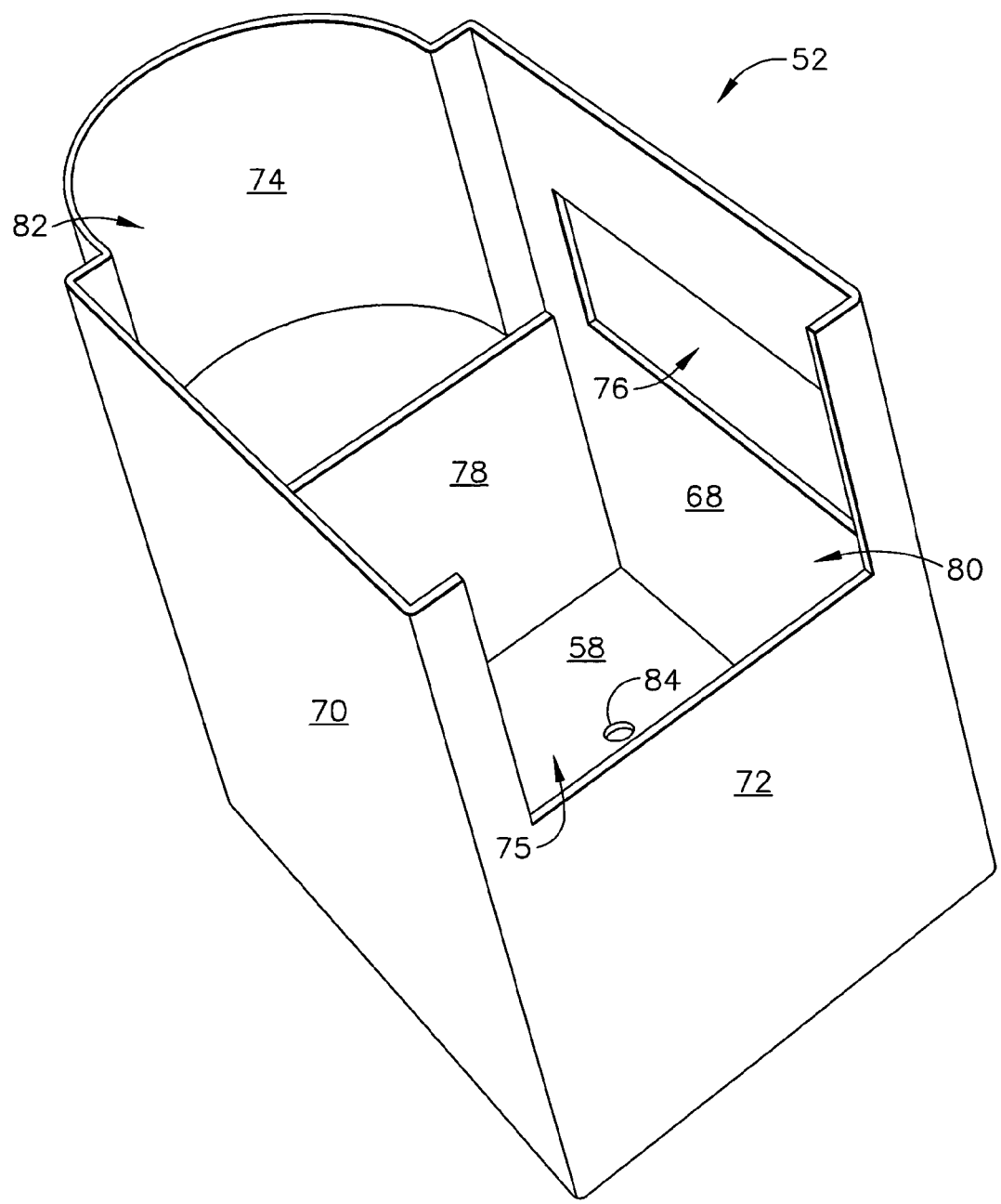
FIG. 4 is a perspective view of the enclosure of the liner assembly shown in FIG. 3.

FIG. 4 is a perspective view of enclosure 52. In the exemplary embodiment, enclosure 52 is fabricated from a metallic material, such as steel, and includes a back wall 68, a front wall 70, a first end wall 72, and an arcuate or curved second end wall 74. First end wall 72 includes a cutout 75 at an upper portion thereof, and back wall 68 includes a window 76 extending therethrough and in open communication with a heat source 26 (see FIG. 1) in back wall 14 of SWET box 10. A dividing wall 78 separates enclosure 52 into a welding chamber 80 and a cavity 82 that is partially bounded by curved end wall 74. Cutout 75 and curved end wall 74 provide an operator access to manipulate a component being repaired in welding chamber 80. A floor 58 in welding chamber 80 includes a hole 84 extending therethrough to enable the admission of a protective gas into welding chamber 80.

Figure 5:
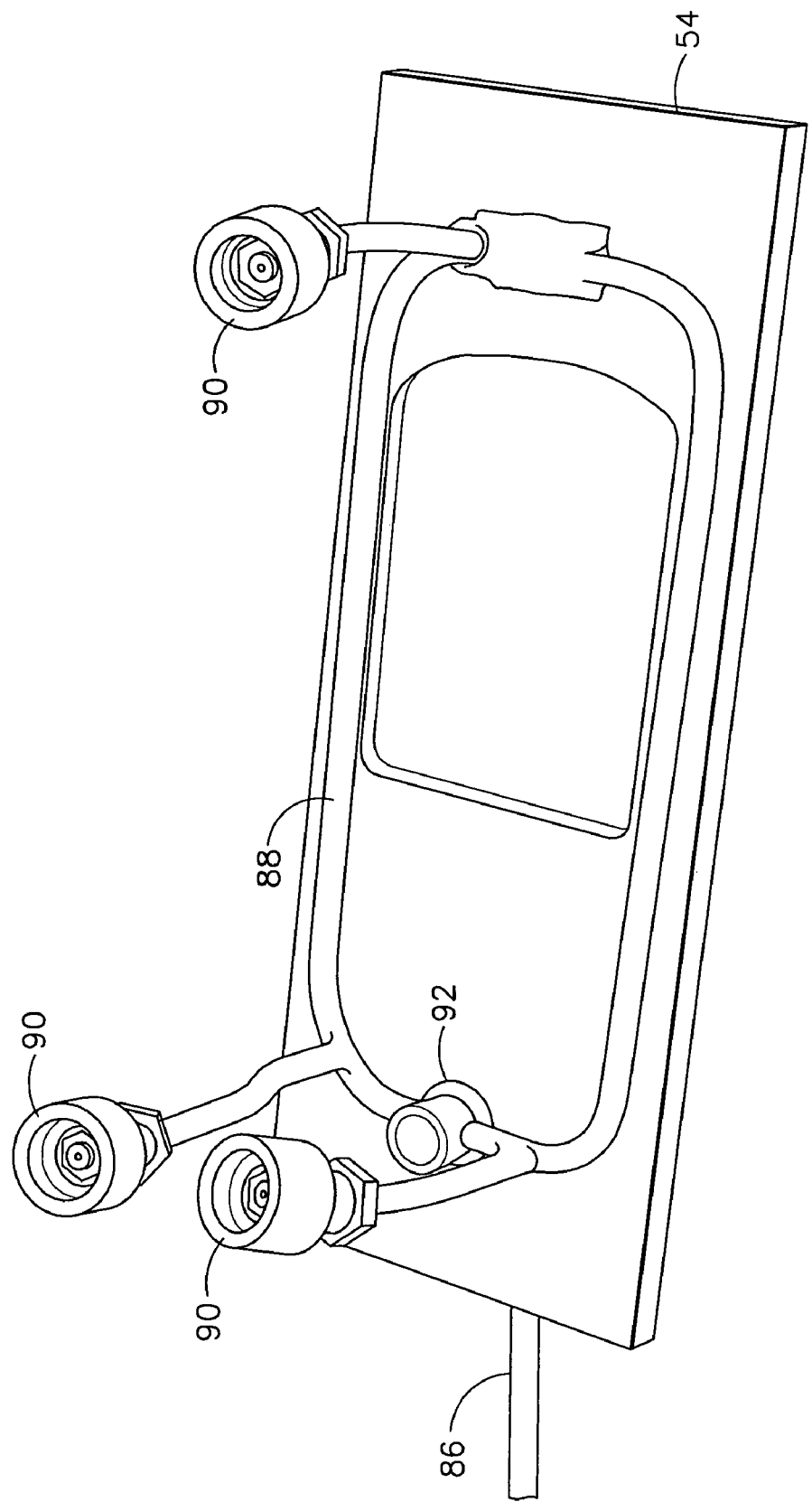
FIG. 5 is a perspective view of the SWET box lid shown in FIG. 3.

FIG. 5 is a perspective view of lid 54. Lid 54 extends over heating chamber 12 (shown in FIG. 1) and liner assembly 50. Second gas delivery system 60 is coupled to lid 54 and includes an inlet tube 86, a distribution tube 88, a plurality of diffuser cups 90, and a coupling 92. When in use, inlet tube 86 is connected to a gas source (not shown) and delivers gas to distribution tube 88 via coupling 92. Diffuser cups 90 extend downward from lid 54 into heating chamber 12 and liner assembly 50 to discharge the gas into an upper portion 93 (see FIG. 3) of SWET box 10. More specifically, diffuser cups 90 slow the flow of protective gas and thereby facilitate controlling the flow of gas into SWET box 10 and facilitate reducing an amount of noise generated as the gas enters SWET box 10. When three diffuser cups 90 are used, as shown in FIG. 5, lid 54 is positioned on SWET box 10 such that one diffuser cup 90 extends into welding chamber 80 and the two remaining diffuser cups 90 extend between curved end wall 74 and SWET box end wall 18. In alternative embodiments more or less than three diffuser cups 90 may be utilized.

Figure 6:
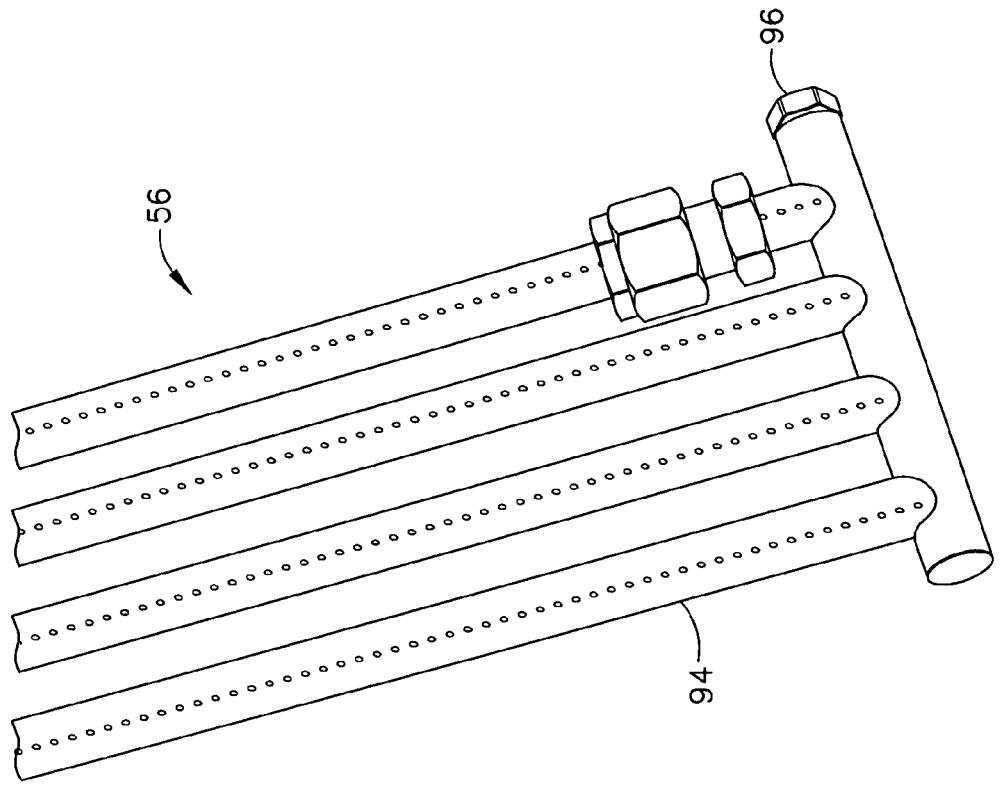
FIG. 6 is a perspective view of the first gas delivery system shown in FIG. 3.

FIG. 6 is a partial perspective view of first delivery system 56. First distribution system 56 includes an array of perforated tubes 94, each of which is connected to, and fed from, a common end line 96. In use, perforated tubes 94 provide a diffuser effect that facilitates reducing the flow of gas through perforated tubes 94 and into SWET box 10. Moreover, supplying the protective gas through perforated tubes 94 also facilitates reducing an amount of noise generated in SWET box 10 in comparison to the unfettered flow through fluid inlets 28 (see FIGS. 1 and 2).

Figure 7:
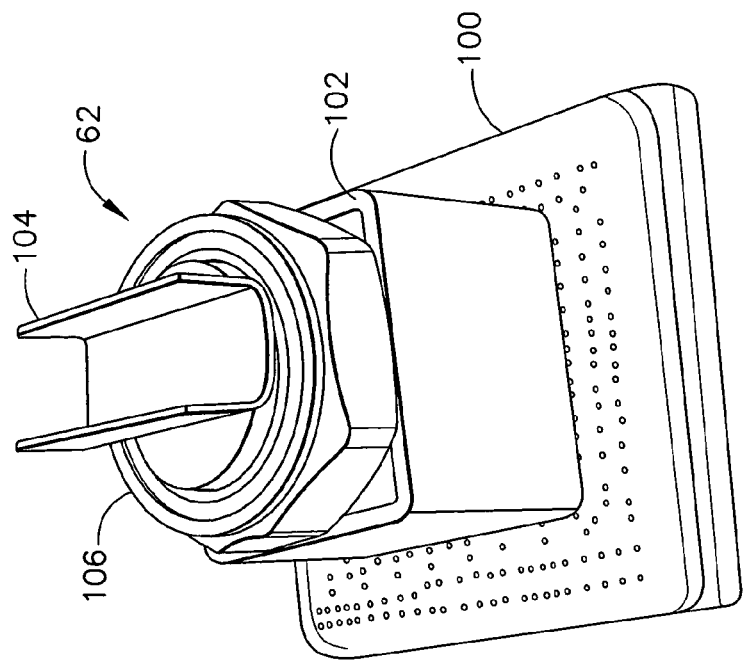
FIG. 7 is a perspective view of the blade holder shown in FIG. 3.

FIG. 7 is a perspective view of blade holder 62. Blade holder 62 includes a perforated base 100, a stand 102 that extends upwardly from base 100, and a channel 104 coupled to an upper end 106 of stand 102. Channel 104 is sized to hold a component part such as a turbine blade oriented in a position to facilitate the performance of a repair operation on the component part.

In operation, and with reference to FIG. 3, liner assembly 50 is placed inside the heating chamber 12 of SWET box 10. Liner assembly 50 is positioned such that window 76 of enclosure 52 is in open communication with heat source 26 in back wall 14 of SWET box 10. With enclosure 52 positioned within SWET box 10, the interior volume of SWET box 10 is divided to form welding chamber 80 within enclosure 52 that is smaller than the total volume of SWET box 10.

First gas delivery system 56 is placed on the bottom of welding chamber 80. Suitable plumbing is provided to connect first gas delivery system 56 to fluid inlet 28 which is connected to a protective gas source (not shown). First gas delivery system 56 includes an array of perforated tubes 94 that diffuse the protective gas and facilitate introducing the protective gas at a reduced a lower noise level in comparison to open flow through fluid inlet 28. Metallic mesh material 66 is packed around perforated tubes 94 to further facilitate diffusing the protective gas and reducing the noise level. A component part to be repaired, such as turbine blade 30, is placed in channel 104 of blade holder 62. Blade holder 62 is then positioned in welding chamber 80 with perforated base 100 of blade holder 62 resting on mesh material 66 and perforated tubes 94.

Lid 54 is positioned on SWET box 10 such that one of diffuser cups 90 extends downwardly into welding chamber 80 and the remaining two diffuser cups 90 extend downwardly into a space between curved end wall 74 and end wall 18 of SWET box 10. Inlet tube 86 on lid 54 is then connected using suitable plumbing to a source of protective gas (not shown).

After positioning blade 30 in SWET box 10, the protective gas is supplied and heat source 26 is activated to provide heat to heating chamber 12. In the case of turbine blade repair, argon is typically the protective gas. It is to be understood, however, that SWET box 10 can be used with components from applications other than gas turbine engines, in which case different materials may be involved and other inert gasses may also be used.

Protective gas is introduced into SWET box 10 from an upper portion 93 through diffuser cups 90 on lid 54. Introduction of the protective gas through diffuser cups 90 facilitates controlling the flow of the protective gas. Protective gas is also introduced from a lower portion 95 of SWET box 10 through perforated tubes 94 in welding chamber 80 which concentrates the protective gas flow in welding chamber 80. Perforated tubes 94 diffuse the protective gas and also facilitate reducing a noise level of the gas flow. Introducing the protective gas through diffuser cups 90 and perforated tubes 94, along with concentrating the gas flow in welding chamber 80 combine to reduce the consumption of protective gas.

When a desired temperature is reached inside SWET box 10, the repair is made. The flow of protective gas is continued during the repair to facilitate maintaining the protective atmosphere. In the case of blade tip repairs on turbine blade 30, weld beads are applied to blade tip 36 to build up the blade material so that the design contour of blade 30 can be restored. Liner assembly 50 facilitates the production of weld beads without contaminates and without cracks within the weld beads.

The above-described SWET box liner assembly provides a cost effective and highly reliable apparatus that reduces the consumption of protective gasses and reduces the noise level in the workplace in comparison to other known SWET boxes. The liner assembly concentrates the protective gas in a reduced volume within the SWET box thereby reducing the amount of gas flow required to maintain a protective atmosphere. The introduction of the protective gas through diffusers contributes to reducing a noise level in the vicinity of the SWET box.

Exemplary embodiments of a SWET box liner assembly are described above in detail. The liner assemblies are not limited to the specific embodiments described herein, but rather each component may be utilized independently and separately from other components described herein. Each component can also be used in combination with other SWET box systems.

While the invention has been described in terms of various specific embodiments, those skilled in the art will recognize that the invention can be practiced with modification within the spirit and scope of the claims.

What is claimed is:

1. A system for a SWET box, said system comprising:
  a liner configured to be received in a heating chamber of the SWET box assembly, said liner comprising a rear wall, a front wall opposite said rear wall, a pair of opposed end walls, and a dividing wall defining a welding chamber therein, said welding chamber sized to receive a component being welded therein;
  a gas delivery system for supplying a protective gas into SWET box and said enclosure;
  a lid coupled to the SWET box and extending over the heating chamber and said enclosure, encasing the heating chamber and said enclosure, said gas delivery system including a first gas delivery system positioned adjacent a floor of said welding chamber and a second gas delivery system coupled to said lid.

2. A system for a SWET box system in accordance with claim 1 wherein said enclosure dividing wall further defines a cavity adjacent to said welding chamber, one of said end walls comprising an arcuate wall that partially borders said cavity.

3. A system for a SWET box system in accordance with claim 1 wherein said welding chamber comprises a side wall having a window open to a heating source in a wall of the heating chamber for supplying heat energy to said welding chamber.

4. A system for a SWET box system in accordance with claim 1 wherein said second gas delivery system includes a diffuser positioned adjacent a floor of said welding chamber, said diffuser coupled to a protective gas source through said floor of said welding chamber.

5. A system for a SWET box system in accordance with claim 4 wherein said diffuser comprises an array of perforated tubes.

6. A system for a SWET box system in accordance with claim 4 further comprising a blade support positioned above said diffuser, said support including a perforated base in flow communication with said diffuser.

7. A system for a SWET box system in accordance with claim 6 wherein said blade support is separated from said diffuser by a layer of mesh material.

8. A system for a SWET box system in accordance with claim 1 wherein said second gas delivery system includes a plurality of diffuser cups coupled to said lid.

9. A SWET box comprising:
  a heating chamber;
  an enclosure configured to be received in said heating chamber, said enclosure comprising a rear wall, a front wall opposite said rear wall, a pair of opposed end walls, and a dividing wall defining a welding chamber therein, said welding chamber sized to receive a component being welded therein;
  a gas delivery system for supplying a protective gas into said heating chamber and said enclosure; and
  a lid coupled to said heating chamber and extending over said heating chamber and said enclosure, encasing said heating chamber and said enclosure, said gas delivery system including a first gas delivery system positioned adjacent a floor of said welding chamber and a second gas delivery system coupled to said lid.

10. A SWET box in accordance with claim 9 wherein said welding chamber comprises a side wall having a window open to a heating source in a wall of said heating chamber for supplying heat energy to said welding chamber.

11. A SWET box in accordance with claim 9 wherein said first gas delivery system includes a diffuser positioned adjacent a floor of said welding chamber, said diffuser coupled to a protective gas source through said floor of said welding chamber.

12. A SWET box in accordance with claim 11 wherein said diffuser comprises an array of perforated tubes.

13. A SWET box in accordance with claim 9 wherein said second gas delivery system includes a plurality of diffuser cups coupled to said lid.

* * * * *